Oct. 18, 1966   C. S. COCKERELL   3,279,416
PROPULSION OF FLEXIBLE-SKIRTED AIR CUSHION SUPPORTED
VEHICLES BY OSCILLATING THE SKIRT
Filed Oct. 3, 1962   6 Sheets-Sheet 1
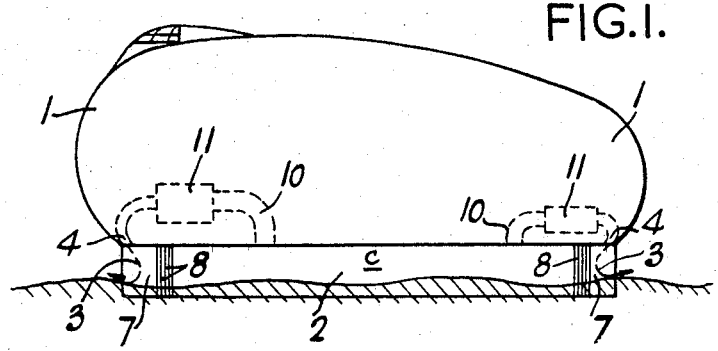
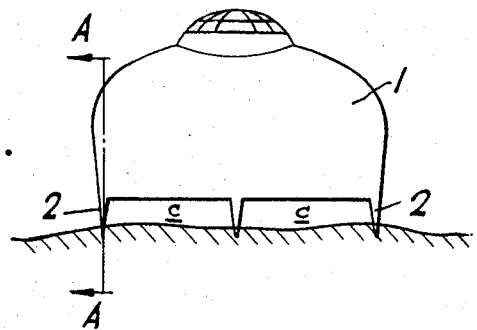
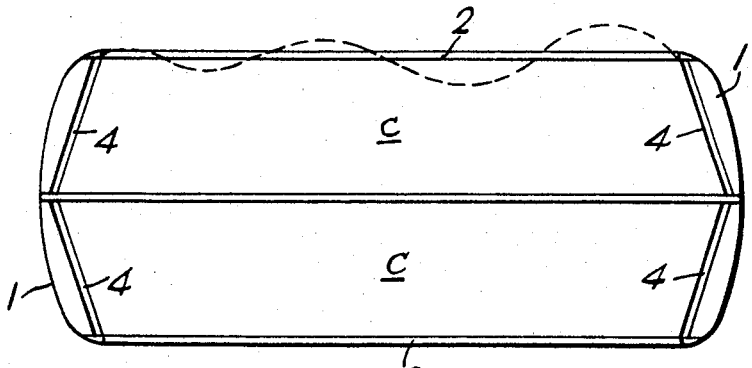
INVENTOR
C. S. COCKERELL
BY
Cameron, Kerkam & Sutton
ATTORNEYS INVENTOR
C. S. COCKERELL
BY
Cameron, Kerkam & Sutton
ATTORNEYS Oct. 18, 1966    C. S. COCKERELL    3,279,416
PROPULSION OF FLEXIBLE-SKIRTED AIR CUSHION SUPPORTED
VEHICLES BY OSCILLATING THE SKIRT
Filed Oct. 3, 1962    6 Sheets-Sheet 4

INVENTOR
C. S. COCKERELL
BY
Cameron, Kerkam & Sutton
ATTORNEYS

INVENTOR
C. S. COCKERELL

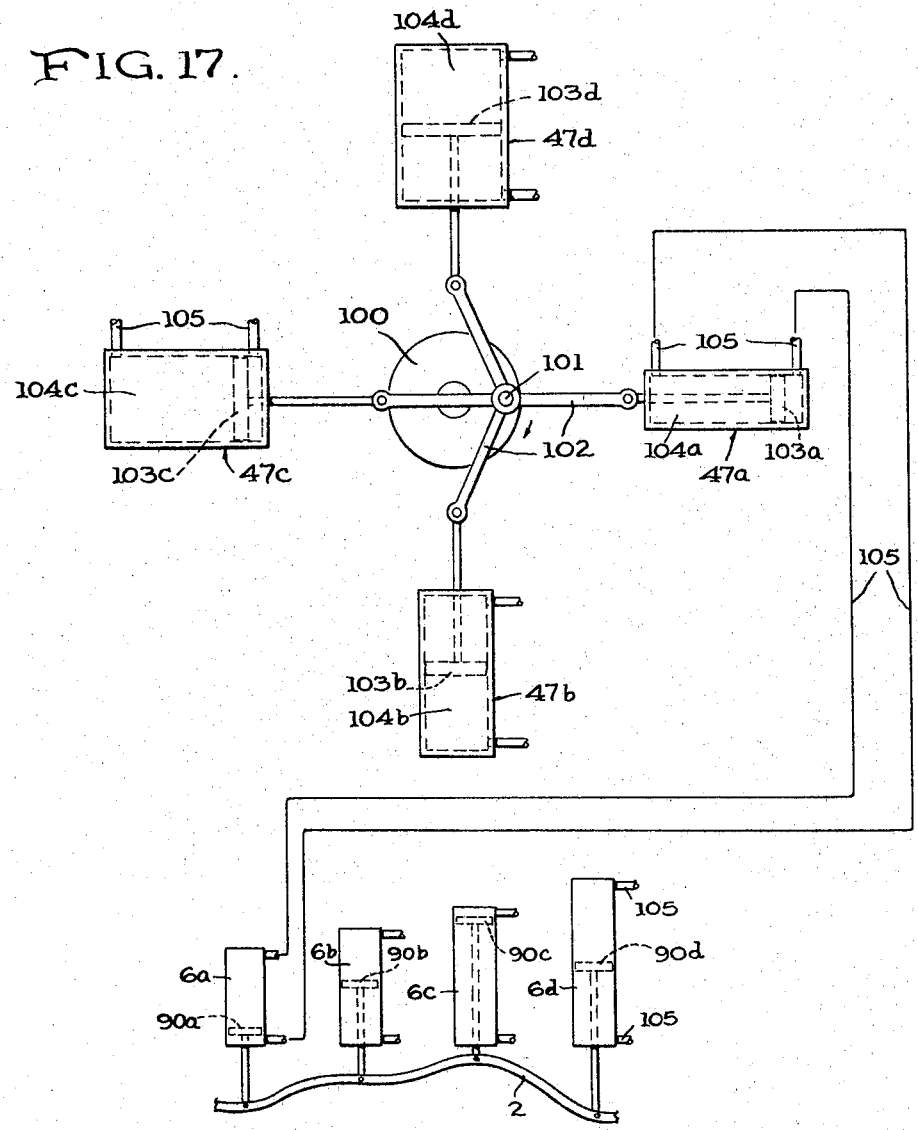

United States Patent Office 3,279,416
Patented Oct. 18, 1966

3,279,416
PROPULSION OF FLEXIBLE-SKIRTED AIR CUSHION SUPPORTED VEHICLES BY OSCILLATING THE SKIRT
Christopher Sydney Cockerell, Southampton, England, assignor to Hovercraft Development Limited, London, England, a British company
Filed Oct. 3, 1962, Ser. No. 228,164
Claims priority, application Great Britain, Oct. 6, 1961, 36,099/61
13 Claims. (Cl. 115—28)

This invention relates to the propulsion of vehicles for travelling over water and other fluid surfaces and which, in operation, are supported above the water surface at least in part by a cushion of pressurised gas.

Such vehicles may be of the so-called plenum chamber form in which the cushion is contained around its periphery by one or more wall members depending from the bottom surface of the vehicle or the cushion may be contained at least in part by one or more fluid curtains issuing from the bottom surface of the vehicle. A yet further form of vehicle is one in which a combination of wall members and fluid curtains is used to contain the cushion.

According to the invention there is provided a vehicle for travelling over a fluid surface in which the main body of the vehicle is supported above the surface at least in part by a cushion of pressurised gas formed and contained beneath the main body of the vehicle, having at least one flexible wall positioned beneath the main body of the vehicle and extending in a direction parallel to the fore and aft axis of the vehicle, the flexible wall in operation being at least partly immersed beneath the surface, and provided with means for causing a travelling wave to travel from one end of the wall to the other for the purpose of propelling the vehicle.

The flexible wall may constitute a wall member serving to contain, in part, the pressurised cushion beneath the body of the vehicle, or to compartment the cushion. More than one such wall may be provided. For example the vehicle may be the type in which the pressurised gas cushion is contained beneath the body of the vehicle by means of fluid curtains at the front and rear of the vehicle and by solid walls at the sides, the side walls being partially immersed during operation, and one or each of these side walls may be flexible to constitute propulsion means for the vehicle. Alternatively in such a vehicle one or more flexible walls may be provided extending from front to rear of the vehicle between the side walls to compartment the cushion space beneath the vehicle.

Flexible walls for the purpose of this invention may be formed in various ways. In one type of construction the wall may be in the form of a continuous flexible member, and the travelling wave may be produced by oscillating one end of wall sideways, either side of a central position. Alternatively the wall may comprise a number of sections flexibly joined together, the travelling wave again being produced by oscillating one end of the wall. Such constructions are of particular use when the wall forms part of the structure containing or dividing the gaseous cushion. The top edge of the wall may be attached to the bottom surface of the main body of the vehicle in a gastight manner, or may co-operate with the bottom surface to form a seal.

In further alternative construction the wall may comprise a number of separate sections, each individually attached to the bottom of the main body of the vehicle. Each such section can be individually controlled and operated, it being possible to vary the form of the travelling wave, e.g. amplitude, pitch and shape, at any position along the wall. Each section may be completely free from the adjacent sections or some sealing means may be provided between each section, such as when the wall is part of the cushion containing or dividing structure.

It is also possible to provide a series of controlling and operating means for the wall which is in the form of a continuous flexible member or of a number of sections flexibly connected together. The form of the travelling wave can then also be varied for these forms of wall.

To propel the vehicle, the travelling wave must traverse along the wall at a speed which is higher than the speed of the wall through the fluid. A braking effect can be obtained by causing the wave to traverse along the wall at a speed slower than the speed of the wall through the fluid, the braking effect being further increased by reversing the direction in which the wave traverses along the wall. Eventually, of course, the direction of movement of the vehicle will be reversed.

A particularly convenient form of vehicle to which the invention can be applied is one in which the gaseous cushion is contained along the side of the vehicle by side walls depending from the bottom of the main body, parallel to the fore and aft axis of the vehicle, at least the bottom portion of the side walls at all times being immersed, the gap between the ends of the side walls, at the front and rear of the vehicle, being closed by one or more fluid curtains. By causing a travelling wave to traverse along the side walls, the vehicle is readily propelled, and by varying the relative speeds and/or forms of the travelling waves in the side walls, a turning or steering moment can be obtained.

The invention will be readily understood from the following description of various embodiments by way of example in conjunction with the accompanying drawings in which:

FIGURE 1 is a side view of a vehicle embodying the invention,

FIGURE 2 is a front view of the vehicle illustrated in FIGURE 1,

Figure 4:
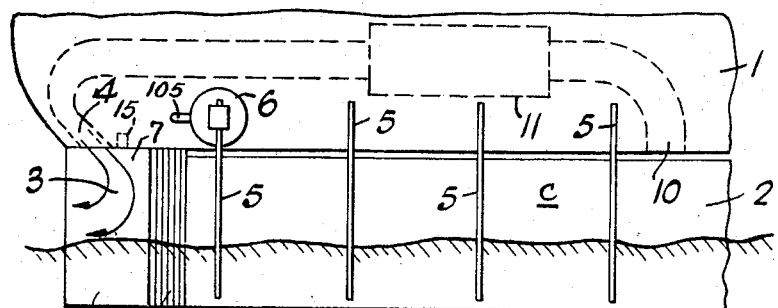
Figure 5:
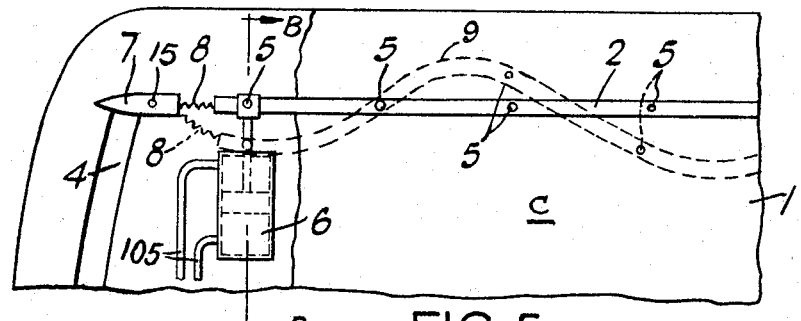
Figure 9:
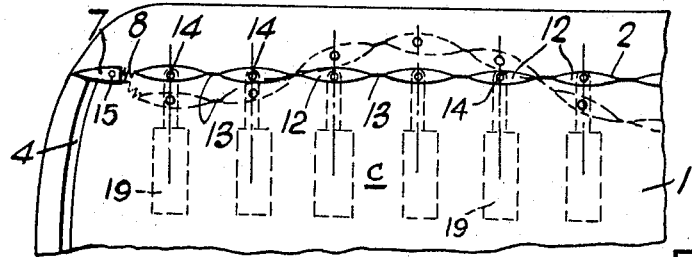
Figure 6:
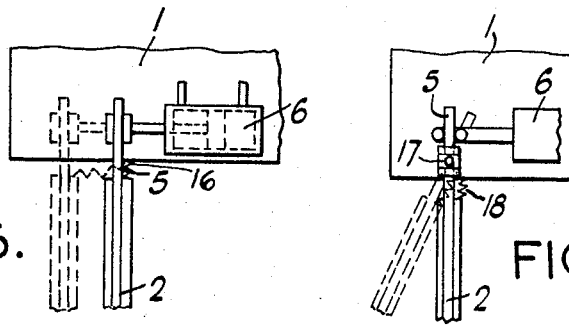
Figure 7:
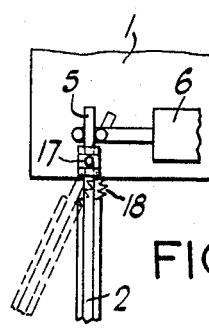
Figure 8:
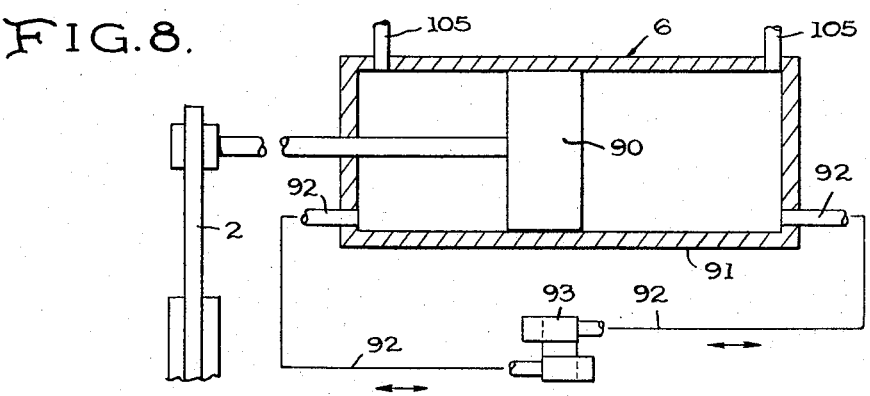
Figure 10:
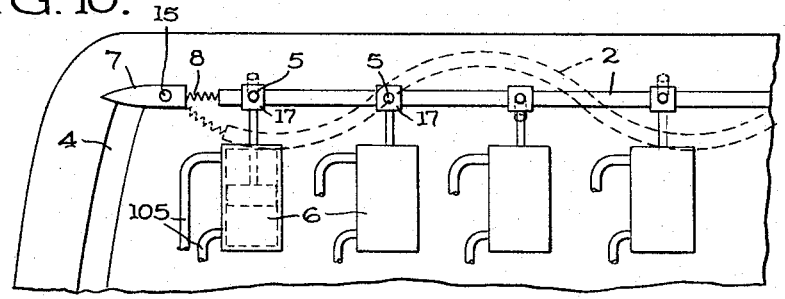
Figure 13:
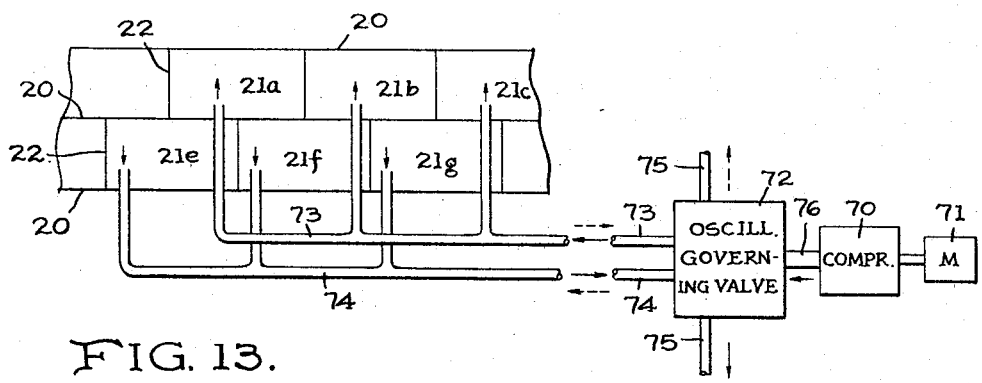
Figure 11:
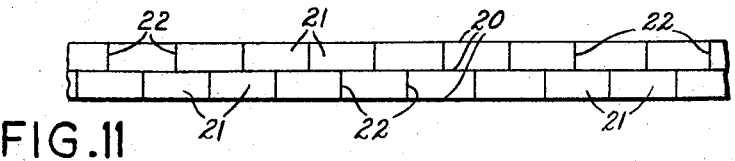
Figure 12:
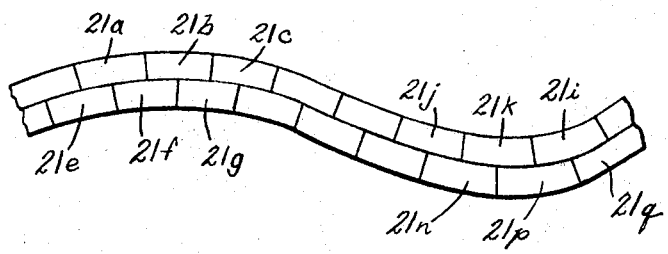
Figure 14:
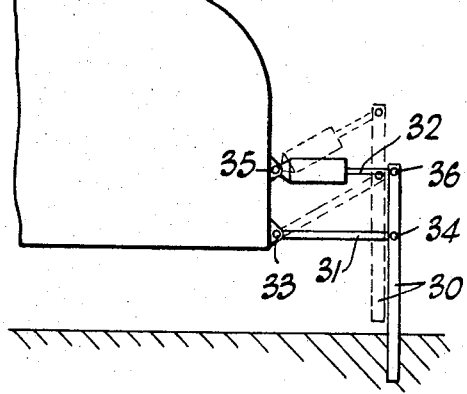
Figure 15:
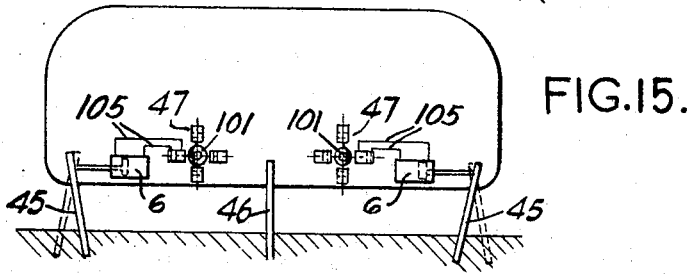
Figure 16:
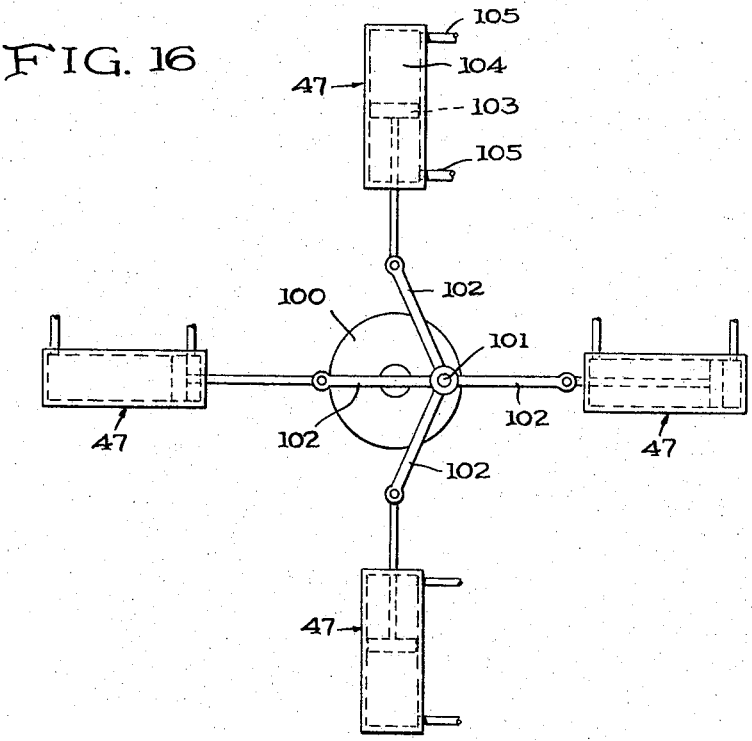
Figure 18:
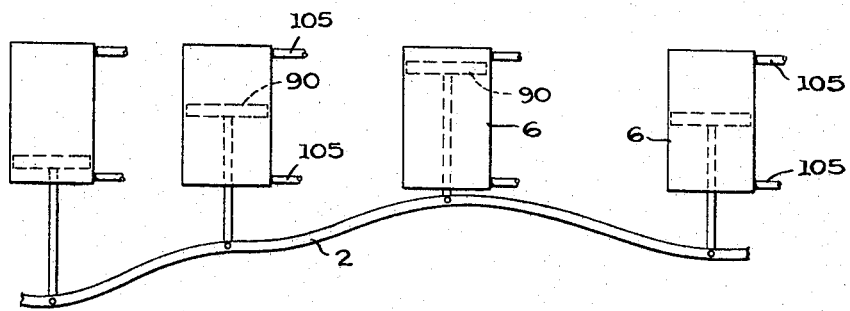

FIGURE 3 is an inverted plan view of the vehicle illustrated in FIGURES 1 and 2, FIGURE 4 is a cross-section on the line A—A of FIGURE 2 to a larger scale illustrating the arrangement of a wall, FIGURE 5 is an inverted plan view of one end of a wall, as illustrated in FIGURE 3 but to a larger scale, FIGURE 6 is a cross-section on the line B—B of FIGURE 5 illustrating one example of apparatus for moving the wall, FIGURE 7 is a similar cross-section to that of FIGURE 6 illustrating an alternative form of apparatus, FIGURE 8 is an enlarged view, partially diagrammatic and partially in cross-section, of a modified wall moving arrangement similar to those of FIGURES 6 and 7 adapted to permit oscillation of the wall to cease at any particular locality while the oscillating means as a whole continues to function, FIGURE 9 is a view similar to that of FIGURE 5 illustrating an alternative construction, FIGURE 10 is a view similar to FIGURES 5 and 9 illustrating an alternative construction for moving the wall embodying a plurality of apparatuses of the form illustrated in FIGURE 7, FIGURE 11 is a horizontal cross-section through a wall illustrating a further alternative form of construction, FIGURE 12 is a similar view to that of FIGURE 11 and illustrates the operation thereof, FIGURE 13 is a diagrammatic illustration of an arrangement for varying the pressures in the individual chambers of the wall shown in FIGURE 12, FIGURE 14 is a vertical cross-section of a vehicle normal to the fore and aft axis, illustrating a particular method of mounting a wall, FIGURE 15 is a vertical cross-section of a vehicle normal to the fore and aft axis illustrating the provision of a wall at each side of the vehicle and also one on the centre line, FIGURE 16 is an enlarged view of a portion of the side wall oscillating means of FIGURE 15, FIGURE 17 is a diagrammatic illustration of a modification of the side wall oscillating means of FIGURE 16 for progressively increasing the amplitude of the wave imposed on the wall as it progresses along the wall, FIGURE 18 is a similar diagrammatic view illustrating an arrangement for increasing the wave length of the wave as it progresses along the wall.

The vehicle illustrated in FIGURES 1 to 5, has a main body 1, which is supported above the surface by a cushion of air C contained at its side by side walls 2. The cushion is enclosed at the front and rear of the vehicle by fluid curtains 3 issuing from supply ports 4 formed in the bottom of the main body 1. The fluid curtains 3 may form the cushion when the vehicle is started up, in a known manner, or alternative or additional means comprising one or more ports 10 can be provided. Air from compressors 11 is fed to the supply ports 4 and also to the ports 10 when provided.

As seen more clearly in FIGURES 4 and 5, each side wall 2 is in the form of a single continuous flexible member with strengthening and supporting ribs 5. A wave is caused to travel along the side wall by oscillating the end by means of a hydraulic piston and cylinder arrangement 6 having pipes 105 for conducting the actuating fluid to and from the opposite ends of the cylinder. In order to provide a seal with the air curtains, a short length of wall 7 can be provided which is attached to the vehicle body and does not oscillate. A flexible sealing member 8 is provided between the length of wall 7 and the side wall 2. Such short length of wall 7, with sealing members 8, are provided at each end of each side wall. Operation of the piston and cylinder arrangement 6 causes a wave to travel along the side wall as indicated by the dotted lines 9. The short lengths of wall 7 may be attached to the vehicle body by pivots 15 so that they can pivot about vertical axes as the side walls 2 oscillate.

The characteristics of the flexible member may vary. For example, the flexible member can be of material which is readily flexed, such as rubber, or may be of material having a finite stiffness such as metal. The flexible member may have low resilience or a high resilience. A typical example of a material having a finite stiffness and a high resilience is spring steel. A thin sheet of spring steel, or other spring tempered material, provides a suitable flexible member.

Two ways of moving the side walls are shown in FIGURES 6 and 7. In FIGURE 6 the side wall 2 is moved bodily sideways by the piston and cylinder arrangement 6, the side wall remaining substantially vertical at all times. A flexible strip 16 can be provided for sealing the gap between the top of the side wall 2 and the bottom surface of the vehicle body 1. Alternatively, it will be obvious that, if the top of the wall comes sufficiently close to the bottom surface of the vehicle, the small amount of leakage of cushion air through the gap may be ignored. In FIGURE 7 the side wall is attached to the main body of the vehicle by a series of spigot bearings 17, the side wall rotating about the horizontal axis of the bearings 17 as the piston moves in and out in the cylinder. Also each portion can rotate about the vertical axis of the bearing as it deflects with the formation of the travelling wave. Each portion of the wall associated with each rib can then rotate relative to the rib as the wall deflects and a simple bearing can be provided at 17. The arrangement illustrated in FIGURE 7 provides for easier sealing of the top of the side wall to the bottom surface of the vehicle, when desired. A flexible member 18 can readily be provided. Further, as in most cases only the lower part of a side wall will normally be immersed in the water, the maximum deflection occurs at the most desirable position. Preferably some provision is made by which operation of the oscillating means 6 can continue, even when a side wall 2 meets with an obstruction, whereby the oscillation of the side wall at the locality of the obstruction ceases until the obstruction is cleared, thus avoiding damage. One form of mechanism for this purpose is illustrated in FIGURE 8. As there shown, the opposite ends of the cylinder 91 of each oscillating unit 6 are connected by way of pipes 92 and a spring-loaded bypass unit 93, whereby, if the pressure on one side of the piston 90 rises unduly by reason of local contact of the wall 2 with an obstacle, the bypass unit 93 then operates to allow hydraulic fluid to pass to the other side of the piston. This arrangement is analogous to that used on the Hele-Shaw Martineau hydraulic steering gear to allow a ship's rudder to yield when an excessive load is applied, as when struck by a wave. See pages 131–133 of MacGibbons' "B.O.T. (Board of Trade) Orals & Marine Engineering Knowledge," 10th edition, published 1947 by James Munro & Co., Ltd., Glasgow, Scotland.

Instead of being in the form of a single continuous member the side walls may comprise a number of separate sections flexibly connected together. Such an arrangement is shown in FIGURE 9. The side wall 2 is formed by a number of sections 12 flexibly connected by portions 13, each section having a rib 14 projecting upwards by which it is supported from the vehicle. A wave can be caused to travel along the side wall by oscillating one end as in FIGURE 5, or a series of piston and cylinder arrangements 19, similar to that shown at 6 in FIGURES 4 and 5, can be provided, one for each section. As indicated in FIGURE 10, a wall of the form illustrated in FIGURE 5 may also be oscillated by a series of piston and cylinder units 6 and spigot bearings 17, similar to that shown in FIGURE 7. With the latter arrangement, the form of the wave can be controlled and varied. An air curtain is formed by air issuing from supply ports 4 to contain the cushion at the front and rear, as in FIGURES 1 to 5, and short rigid portions 7 may be provided at each end of the vehicle together with sealing members 8.

It has been proposed to make walls inflatable. Such walls can readily be arranged to provide propulsion. Where the wall is divided into separate sections it is possible to vary the relative inflation pressures from section to section to cause the wall to oscillate and thus avoid the use of cylinders and pistons with the necessary connecting rods or levers. The walls can be inflated by any suitable fluid, such as by air, water and the like. FIGURES 11 and 12 illustrate one form of such a wall.

The wall comprises three flexible skins 20 spaced apart, the spaces between the skins being divided into fluid tight chambers 21 by partitions 22. By varying the pressures in the chambers 21 the side wall can be caused to deflect. Thus, as in FIGURE 12, if the pressures in chambers 21a, 21b and 21c are increased and the pressures in chambers 21e, 21f and 21g are decreased the wall will deflect in one direction as shown, whilst a reduction in chambers 21j, 21k, and 21i, and an increase in chambers 21n, 21p, and 21q will cause a deflection in the opposite direction, as shown. By suitably controlling the pressures in the chambers 21 and causing the pressure variations to travel along the wall, a wave of a predetermined form can be caused to travel along the wall. The form of the wave can also be varied as it travels along the wall, if so desired.

FIGURE 13 illustrates an arrangement whereby the pressures in the chambers 21 may be varied as above described so as to cause the inflatable wall to deflect. As shown, an air compressor 70 is driven by a motor 71 and supplies pressurised air through a duct 76 to an oscillatory governing valve unit 72 similar to that disclosed in patent No. 1,772,310. The valve unit 72 is connected to a pair of pipe lines 73 and 74, each of which is connected to a group of the chambers 21 for the purpose of alternately inflating and deflating the latter. For example, pipe line 73 may be connected to chambers 21a, 21b and 21c, while pipe line 74 is connected to chambers 21e, 21f and 21g. When the valve of unit 72 is in one of its working positions, pressurised air will be supplied through pipe line 73 to cells 21a, 21b and 21c, and at the same time air will be exhausted from cells 21e, 21f and 21g through pipe line 74 and vented to the atmosphere through one of exhaust pipes 75 with which the valve unit is provided. When the valve is oscillated to the other of its working positions, the flow of air to and from the chambers is reversed, chambers 21e, 21f and 21g being inflated while chambers 21a, 21b and 21c are deflated.

A further arrangement in which the wall can move up and down is illustrated in FIGURE 14. This illustrates part of a vehicle, the wall being in the form of a side wall 30. The side wall 30 is supported from the main body of the vehicle by means of a strut 31 and a jack 32. The strut 31 is pivoted at 33 to the bottom of the vehicle body and at 34 to the wall. The jack 32 is pivoted at 35 to the side of the vehicle and at 36 to the top of the wall 30 and is parallel to the strut 31. The wall can thus move up and down in a substantially vertical plane, whilst the jack 32 can impose the oscillations for forming the travelling wave.

Where the wall is immersed for only the lower part, this can be shaped to more readily cut through the surface than the upper part of the wall.

Walls as described above can be applied to vehicles in various ways. For example, when the vehicle is of the form in which the air cushion is contained along the sides of the vehicle by side walls, then these side walls provide a convenient way of applying the invention. Such an arrangement is illustrated in FIGURE 15. Side walls 45 are provided, one on each side of the vehicle, and travelling waves are caused to traverse along the walls as hereinafter described. The cushion may also be divided by one or more walls 46. These dividing walls may also be used for propulsion in addition to or instead of the side walls 45. Only a part of a side wall or a dividing wall may be used for propulsion. Thus such a wall may be in two parts, a rigid wall, which takes no part in propelling the vehicle and a flexible wall, which is used to propel the vehicle. The term flexible wall is intended to include such flexible parts of a side wall or dividing wall.

FIGURE 16 shows on an enlarged scale the hydraulic arrangement of FIGURE 15 for so operating the piston and cylinder units 6 as to cause travelling waves to traverse along the side walls 45. In this arrangement, a fly wheel 100, which may be rotated in any suitable manner, is provided with an eccentric crank pin 101 to which are connected by connecting rods 102 the pistons 103 of four hydraulic units 47 which are positioned radially around the axis of the fly wheel 100. The cylinder 104 of each unit 47 is connected by pipes 105 to one of the wall oscillating piston and cylinder units 6. Consequently, as the fly wheel 100 rotates, the pistons 103 of the units 47 reciprocate in a phased relationship to each other causing the piston and cylinder units 6 to reciprocate correspondingly, and thus cause a wave to travel along the wall 45. As will be evident from the relative positions of the pistons of units 47 and actuators 6 shown in FIGURE 15, the two side walls 45 will be oscillated in anti-phase relationship in the arrangement illustrated because the pistons of oppositely-facing actuators 6 operate simultaneously and in opposite directions.

Where two or more walls are provided along which travelling waves are caused to traverse, then by suitably controlling the waves, either in frequency or form, or both, the vehicle can be steered. For propulsion, the speed of the wave must exceed the speed of the wall relative to the water. By slowing down the wave to below this relative speed, a braking or slowing down of the vehicle is obtained. By reversing the directions of traverse of the wave, the vehicle can be propelled backwards. With two walls, the vehicle can be readily maneuvered by making one wave travel in one direction and the other wave in the reverse direction.

It will be appreciated that the overall length of the wall is longer when a wave is created than in the static position and the extension of the side wall will vary with the amplitude of the wave. The construction of the wall must therefore be such as will allow this extension. Similarly, when mounted so that vertical movement can occur, as for example in FIGURE 14, the construction of the wall must be such as will allow the up and down movement of the various portions of the wall.

The means for operating the piston and cylinder arrangements, where the individual sections of a wall are controlled, may vary, but a suitable arrangement, for example, is the use of a series of hydraulic piston and cylinder units 47 arranged radially round a common offset crank pin or cam 101, as shown in FIGURE 15 and in greater detail in FIGURE 16. By connecting the units 47 in sequence to successive piston and cylinder actuators 6 of the wall, the pistons of said actuators will move sequentially and a wave motion will travel along the wall to propel the vehicle. The cylinders of the units 47 and the actuators 6 and the associated pipes are full of hydraulic fluid at all times.

Where a wall extends for a length which is substantially more than the wave length imposed on the wall, e.g. it extends a distance which is a multiple of the wave length, then in order for the wall to impart a propulsive thrust for its entire length, it is necessary to vary the form of the wave as it progresses along the wall, such as by increasing the amplitude or the wave length, or both, progressively.

An increase in amplitude can be obtained quite readily, for example, by providing the pistons of units 47 in FIGURE 15 with progressively increasing displacements, the piston having the smallest displacement being connected to an operating cylinder at the front of the wall and the piston with the maximum displacement being connected to an operating cylinder at the rear of the wall. Such an arrangement is illustrated in FIGURE 17, wherein the pistons 103a, 103b, 103c and 103d increase in diameter clockwise around the fly wheel 100, while the cylinders of actuators 6a, 6b, 6c and 6d to which said pistons deliver progressively increasing amounts of displaced actuating fluid are made progressively longer, thereby progressively increasing the amplitude of movement of the portions of the wall to which the pistons 90a, 90b, 90c and 90d are connected.

The wave length can be lengthened by positioning the operating cylinders along the wall with progressively increasing distances between them, the cylinders being closer together at the front than at the rear, as illustrated in FIGURE 18.

The wall, as used for propulsion may extend for only a part of the length of the vehicle, a further wall or further walls extending forward of and/or rearward of the propulsion wall.

Vehicles as described above will normally be operated over water, but they can also be operated over other fluid or fluid like surfaces such as mixtures of mud and water and also stretches of water which are severely choked with weeds and the like.

The flexible wall may be made retractable. This could be an advantage when loading and unloading a vehicle as the vehicle could be brought to rest on a land surface instead of requiring to be moored alongside a dock or the like having a minimum depth alongside to accommodate the flexible wall. The flexible wall may also vary in vertical cross-section between its upper and lower edges, as indicated in FIGURE 2.

I claim:
1. A vehicle for travelling over a fluid surface wherein the vehicle body is supported above that surface at least in part by a cushion of pressurised gas formed and contained beneath said body, comprising a spaced pair of vertically disposed flexible walls depending from the vehicle body and extending lengthwise in directions substantially parallel to the fore and aft axis of the vehicle so as to at least partly contain said cushion, said flexible walls in operation being at least partly immersed beneath said surface, and means connected to said walls for reciprocating at least a portion of each wall transversely to the plane thereof whereby a wave is caused to travel along each of said portions for the purpose of propelling the vehicle.
2. A vehicle as claimed in claim 1 wherein each wall is in the form of a continuous flexible member.
3. A vehicle as claimed in claim 1 wherein each wall is hollow and inflatable and is provided with internal wall means which define with the wall a series of separate inflatable chambers, and including means for inflating and deflating said chambers in sequence to form said travelling wave.
4. A vehicle as claimed in claim 1 including a plurality of wall reciprocating means connected to each wall at spaced apart locations.
5. A vehicle as claimed in claim 1 including means for progressively increasing the amplitude of said travelling wave from the front end of each reciprocable wall portion to the rear end thereof.
6. A vehicle as claimed in claim 1 including means for progressively increasing the wave length of said travelling wave from the front end of each reciprocable wall portion to the rear end thereof.
7. A vehicle as claimed in claim 1 wherein said wall reciprocating means oscillate the respective portions of said walls in an anti-phase relationship.
8. A vehicle as claimed in claim 1 including means for supporting each reciprocable wall portion at a plurality of spaced apart locations and guiding said wall portion to oscillate at each location in a plane normal to the fore and aft axis of the vehicle.
9. A vehicle as claimed in claim 1 including a structural member depending downwardly from the vehicle body to which one end of each wall is flexibly connected.
10. A vehicle as claimed in claim 1 wherein each reciprocable wall portion oscillates to and fro normal to a line extending in the direction of the associated wall.
11. A vehicle as claimed in claim 1 wherein each of said walls includes a portion which oscillates by rotational movement about a pivot extending in the direction of the associated wall.
12. A vehicle as claimed in claim 1 wherein the vertical cross-section of each wall varies between its upper and lower edges.
13. A vehicle for travelling over a fluid surface wherein the vehicle body is supported above that surface at least in part by a cushion of pressurised gas formed and contained beneath said body, comprising a spaced pair of vertically disposed flexible walls positioned beneath the vehicle body and extending in directions substantially parallel to the fore and aft axis of the vehicle so as to at least partly contain said cushion, said flexible walls in operation being at least partly immersed beneath the surface, reciprocating means connected to said walls at spaced apart locations, and means for operating said reciprocating means in a phased relationship to deflect each wall into a wave form profile which profile travels along the wall from one end thereof to the other for the purpose of propelling the vehicle, said reciprocating means comprising a plurality of hydraulically actuated piston and cylinder arrangements each having a piston connected to the upper end of a vertically extending rib of said wall and adapted to reciprocate transversely to the plane of said wall.

References Cited by the Examiner

UNITED STATES PATENTS

| | | | |
|---|---|---|---|
| 2,509 | 3/1842 | Rudd | 115—28 |
| 842,278 | 1/1907 | Wade | 115—28 |
| 1,123,589 | 1/1915 | Porter. | |
| 2,387,627 | 10/1945 | Warner. | |
| 3,027,860 | 4/1962 | Priest | 180—7 X |
| 3,048,141 | 8/1962 | Fisk | 115—28 X |
| 3,078,940 | 2/1963 | Rolle | 180—7 |
| 3,140,687 | 7/1964 | Beardsley | 180—7 X |
| 3,185,239 | 5/1965 | Cockerell | 180—7 |

FOREIGN PATENTS

| | | |
|---|---|---|
| 126,231 | 5/1919 | Great Britain. |
| 1,238,499 | 7/1960 | France. |
| 1,251,967 | 12/1960 | France. |
| 136,636 | 3/1961 | Russia. |
| 137,405 | 4/1961 | Russia. |

A. HARRY LEVY, *Primary Examiner.*